Oct. 27, 1925.
J. H. GILLIS
1,559,040
CONTINUOUS PROCESS FOR THE MANUFACTURE OF ROOFING ELEMENTS
Filed March 15, 1923    2 Sheets-Sheet 1
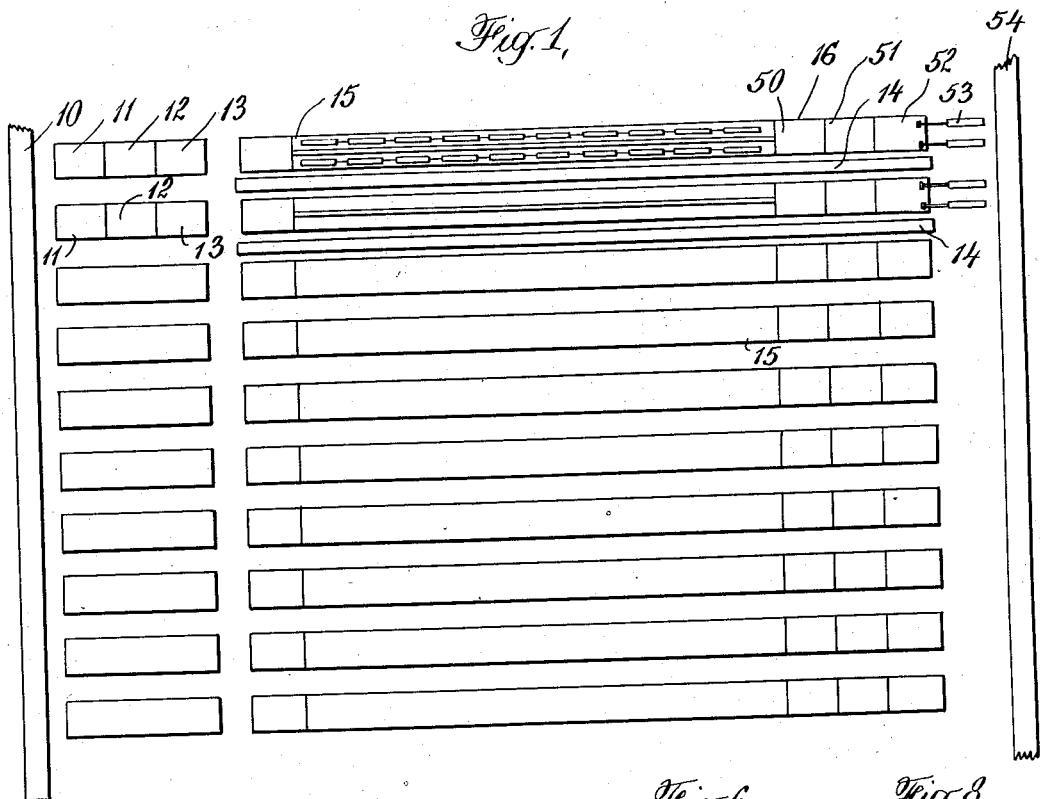
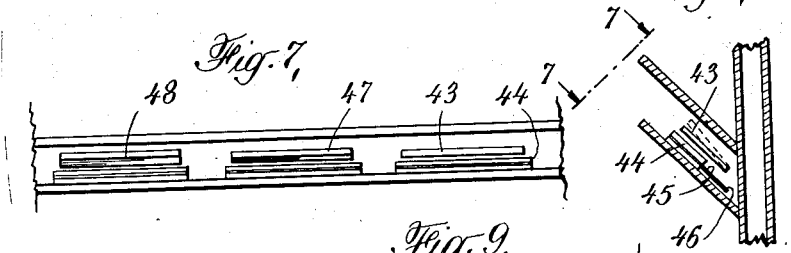
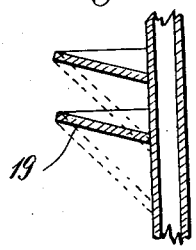
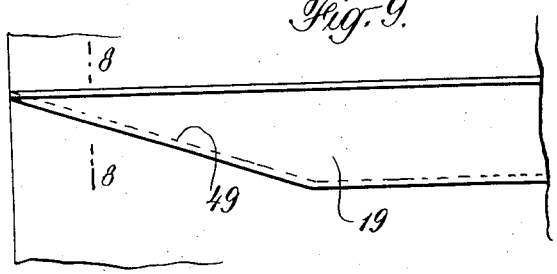
INVENTOR
Julius H. Gillis
BY
his ATTORNEYS

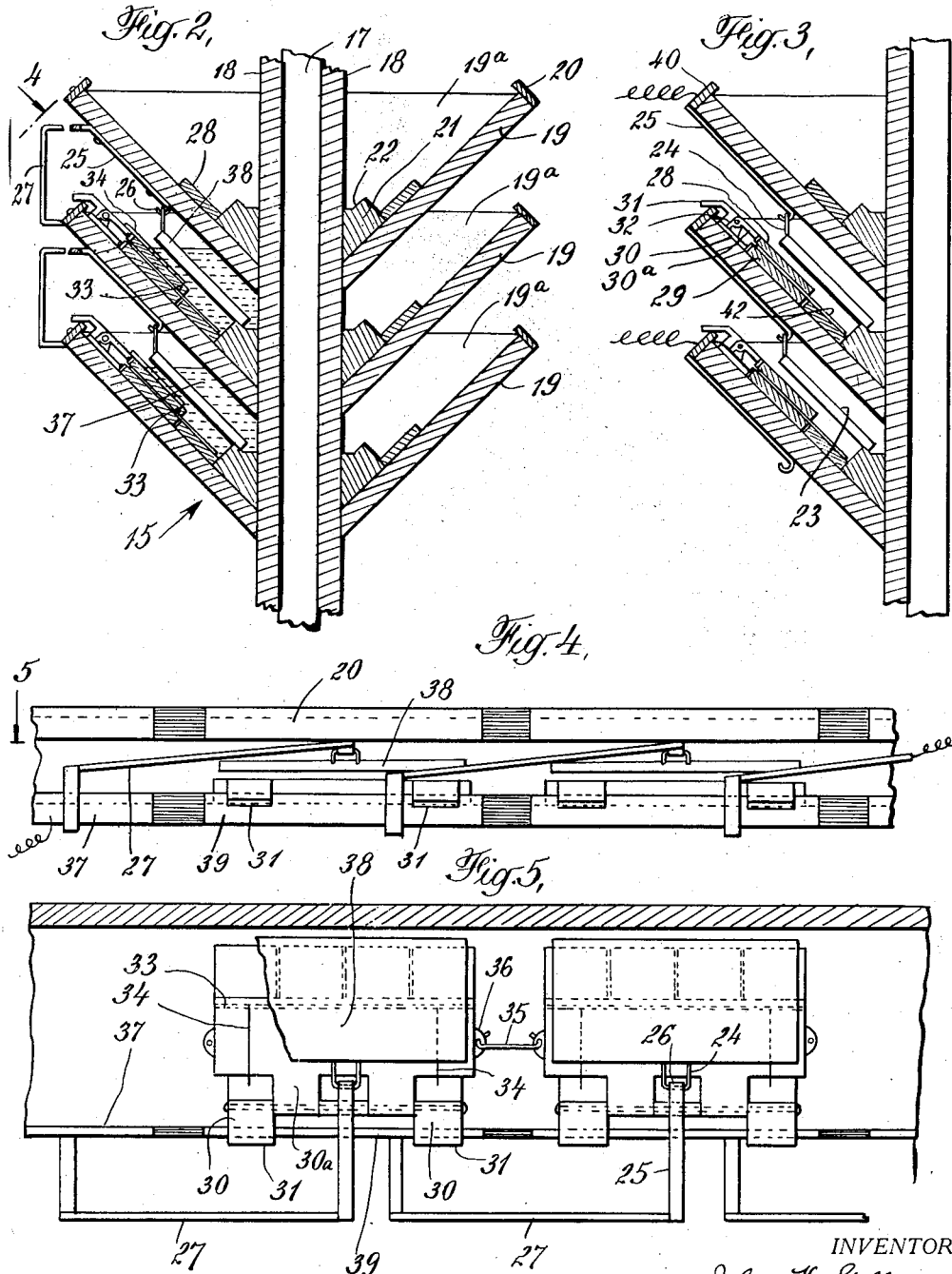

Patented Oct. 27, 1925.

1,559,040

UNITED STATES PATENT OFFICE.

JULIUS H. GILLIS, OF ELIZABETH, NEW JERSEY, ASSIGNOR, BY MESNE ASSIGNMENTS, TO ANACONDA SALES COMPANY, A CORPORATION OF DELAWARE.

CONTINUOUS PROCESS FOR THE MANUFACTURE OF ROOFING ELEMENTS.

Application filed March 15, 1923. Serial No. 625,286.

*To all whom it may concern:*

Be it known that I, JULIUS H. GILLIS, a citizen of the United States, residing at Elizabeth, in the county of Union, State of New Jersey, have invented certain new and useful Improvements in Continuous Processes for the Manufacture of Roofing Elements; and I do hereby declare the following to be a full, clear, and exact description of the invention, such as will enable others skilled in the art to which it appertains to make and use the same.

This invention relates to a process and apparatus for the production of roofing elements, and more specifically, elements formed of a base of heat insulating material provided with a metallic protective layer over the weather surface.

The elements which it is intended to produce by this invention take the form of boards, strips, shingles, tiles and the like and the body of these elements is made of various materials of heat insulating qualities. For this purpose, asphaltic or other bituminous compounds, magnesite compositions, impregnated felt and asbestos products and many similar resistant and non-deteriorating materials may be used. I have found that such a base may be made peculiarly durable as well as given a distinctive and attractive appearance, by coating the surface area to be exposed to the weather, with a non-corrodible metal such as copper. By the use of such a metallic coating, the element combines the long life of a metal roofing with the heat insulating qualities of the base materials. Metal roofing in the form of sheets, strips, etc., is quite satisfactory as to durability but it transmits heat so rapidly as to necessitate the use of some sort of an insulating sheathing beneath it. Elements of the specified materials without the protected weather surface fulfill the requirements as to heat insulation but are not altogether durable and not as agreeable to the eye as the metal. The element which I contemplate producing, therefore, combines the good qualities of each kind of roofing, and since the metal is to be applied only to the exposed areas in relatively thin layers, the elements may be easily handled and applied.

The present invention, now to be described, provides a process and apparatus for applying the metallic protective layer to roofing elements in a continuous series, the elements being successively passed through the various steps of the process and acted on by the apparatus to produce the finished articles.

Before describing the steps in the process, and the apparatus used for carrying on these steps, it is to be pointed out that the elements to be treated are made of any of the materials previously referred to, and are cut in the desired size and shape. One of the usual forms is oblong in shape with spaced slots cut along one edge so that when the elements are laid their appearance is somewhat similar to a shingle roof.

Briefly stated, my process comprises applying an adhesive material to the surface of the element, applying a conducting coating, drying, electrolytically depositing the metal over the conducting area, which will of course be the weather surface, washing the element to remove any adhering electrolyte, and if desired, treating the metal to produce color effects. The apparatus which I shall presently describe, shows convenient and efficient means for carrying on the several steps of the process.

To make clear the practice of the new process and to illustrate one form of apparatus to be used for such purpose, I shall refer to the accompanying drawings showing diagrammatically the sequence of steps and the several operations.

Fig. 1 is a diagrammatic plan view of the layout of the apparatus by which the several steps are performed. Fig. 2 is a vertical cross-sectional view of a detail of the electrolytic troughs. Fig. 3 is a similar view of a modified form of trough. Fig. 4 is a view of a detail of the trough shown in Fig. 2, and taken at an angle to the vertical as indicated by the arrow 4 Fig. 2. Fig. 5 is a view of one compartment of a trough taken on the line 5—5 of Fig. 4. Fig. 6 is a cross-sectional view of a detail of the trough and Fig. 7 is a view taken at an angle to Fig. 6 as indicated by the arrow 7. Fig. 8 is a cross-sectional view of a detail of a trough, taken on the line 8—8, Fig. 9. Fig.

9 is a side view of a detail of a trough, showing the discharge end.

Referring now to the drawings, there is shown in Fig. 1 in diagrammatic form, a layout for a plant consisting of a number of electrolytic units with the various other apparatus which is necessary for maintaining a continuous production. The roofing elements are brought from the source of supply by means of a conveyor 10, this conveyor running along the receiving end of the battery of depositing units. From the conveyor the elements are removed as they are required and the first step in the process consists in preparing the elements for the deposition.

As has previously been explained, the elements are made of various materials, such as asphaltic compositions, and these materials are ordinarily non-conducting. It is therefore necessary that a conducting surface or coating be provided so that the metal may be deposited by electrolysis. In some instances the elements are to have a pebbled appearance and this is obtained by means of such material as crushed slate, magnetite or crushed petroleum coke, the granules of these substances being pressed into the surface of the base before the latter is hard. Crushed slate is of course nonconducting but magnetite and petroleum coke are sufficiently conducting so that the metal may be directly deposited thereon without any preliminary treatment. In the case of the ordinary unpebbled element or an element having crushed slate embedded in its surface, it is necessary, however, that a conducting layer be provided and this preliminary treatment is carried on at the stations 11, 12 and 13.

After the elements are delivered by the conveyor 10, they are transferred to a second conveyor at the station 11. On this conveyor and at this point there is first applied a coating of an adhesive material. This adhesive, which is to bind the conducting material to the element, may be of various substances, but I have found that a dilute solution of sodium silicate is preferable for the purpose since it has the desired adhesive qualities, is comparatively inexpensive, and in the electrolytic operation produces no harmful effects in fouling the electrolyte or the electrodes. This adhesive may be applied by means of a spray brush and will of course be directed only on the surface on which the deposition is to take place. The coating operating may be carried on while the elements are on the conveyor and moving past the station, or the elements may be removed, coated, and then replaced.

From the station 11 the elements with the adhesive coating are transported to the station 12, at which point the conducting layer is to be applied. The material which is best suited for this purpose is powdered graphite since it is a good conductor, easily applied, and relatively inexpensive. The station 12 is preferably spaced at a little distance from the station 11, so that the adhesive coating will have a chance to dry partially before the graphite layer is added, this partial drying causing the adhesive to become tacky. The powdered graphite may be blown on by means of an air brush as the elements are conveyed along, or else the elements may be removed from the conveyor, the surface covered with graphite and the elements then passed along.

The elements so treated are next conveyed to station 13, where there is provided a drying chamber. This may be of any desired form and in it there is maintained a drying atmosphere of about 50° C. The chamber will be of such length, and the speed of conveyance through it so determined, that the adhesive with the graphite embedded in it will have a chance to harden thoroughly during the passage of the elements therethrough.

As has been previously mentioned, elements having a magnetite or petroleum coke surface need not be coated as has just been described. However, all the elements, whether coated or not, are subjected to the following steps during which the electro-deposition takes place.

From the station 13 the elements are removed and are next placed in electrolytic tanks. These elements are in some cases rigid and in others flexible and of various sizes, shapes and thicknesses, and since they must be handled in large quantities and as rapidly as possible it is desirable that they be carried along through the electrolytic tanks while deposition is taking place on them so that the elements will be successively plated and may be removed, one after the other, and conveyed to the storage departments. In order that the elements may be easily handled there are provided holders, one holder being attached to each element and serving to support and protect it during the electrolysis, and to provide a means by which a series of elements may be moved through the tanks.

Another function which is served by these holders consists in limiting the deposit of the metal. Obviously it would not be desirable to apply the adhesive and conducting coatings with exactness over the weather surface where the metal is to be deposited, and it is necessary further that this metallic deposit be fairly closely limited to the weather surface in order that the metal may not be wasted and that the elements may have a neat and regular appearance. By providing a holder of non-conducting material which masks that portion of the element on which the plating is not to be done, it is possible to employ coating methods which are not precise and at the same time exactly limit the deposition to the desired areas.

After the elements come from the drying chamber one holder is attached to each element and the elements and holders are then placed in the electrolytic tanks, the holder of the newly added element being connected to the holder of the element just preceding it. There is provided at the end of these tanks some sort of mechanical pulling device by which the string of elements may be continuously moved through the tanks. When the elements have been passed through the tanks the holders are removed and are then returned to the front end of the tanks by means of conveyor 14.

In Fig. 1 there is shown a series of these electrolytic tanks designated at 15 and each tank has associated with it a series of washing tanks indicated at 16 and later to be described. The construction of the tanks will be better understood by reference to the other figures in the drawings and each tank consists of a base of any suitable material on which is mounted a central longitudinal partition 17. This partition is faced with any suitable material which will not be effected by the electrolyte, such as slate shown at 18 and mounted on either face of the central partition is a plurality of inclined partitions 19, also made of slate or other like non-conducting material. These partitions 19 with the central partition 17 and end walls 19ª provide a series of electrolytic troughs or compartments in each of which a series of elements may be plated.

On the upper edge of each of the partitions 19 is located a series of bus-bars 20 shown more clearly in Fig. 4. Each of these bus-bars is about equal in length to the anodes which are used and which in turn correspond fairly closely to the size of the elements which are to be coated. On the upper surfaces of the partitions 19 and lying against the facings 18 are supporting strips 21 which fit into the angle between the partitions and the facings and which are channeled along their upper surfaces, as at 22 to provide supports for the anodes 23. These anodes are in the form of plates and are provided centrally of one edge with angularly disposed stirrups 24. On the under surface of the partitions 19, as indicated in Fig. 2, is mounted a series of terminals 25 which have hooks 26 at their lower ends. These hooks serve as supports for the stirrups of the anodes, the lower ends of which rest in the channels 22, as shown in Figs. 2 and 4, and it will be noted that the terminals 25 are provided with connectors 27 by means of which each bus-bar is connected to the anode next in sequence. In Fig. 3 the connections are somewhat similar but in this instance each anode is connected to the bus-bar immediately above it so that the bus-bar of one trough is connected to the anode of a different trough. The purpose of these connections will be presently set forth.

In addition to the supporting strips 21 in each compartment there is provided a removable guide strip 28 which lies against the inner face of the partition 19 and which serves to guide the end of the roofing elements projecting beyond the holder. These holders may be constructed of various non-conducting materials, as, for instance, wood, bakelite, or enameled metal, and are formed with two plates 29, to which are attached projecting hinge members 30 and 30ª. These hinge members are pivoted together by means of a pintle and the member 30 will be seen to be provided with an extending portion 31, which overlies the edge of the compartment, making contact with the bus-bar on the outer edge of the partition, and also serving to support the holder with the element and to limit its inward movement in the trough. The member 30ª will be seen to be provided with a locking lug 32 which bears against the face of the other hinge member and causes the holder to grip the element tightly.

In the surface of the upper plate there is embedded a bare wire 33, this wire extending entirely across the plate and having a portion lying above the surface of the plate. This wire is placed so that it will make contact with the conducting coating on the element and there are provided conductors 34, 34 on the surface of the upper plate by means of which the wire is electrically connected with the hinge members and thus with the bus-bars 20.

The anodes which are of copper cast in appropriate size and preferably of about the shape and size of the roofing elements and the latter are to be moved through the troughs with an intermittent movement so that, at each period of rest, one of the elements will be opposite one of the anodes. To start the process, a series of anodes are placed in their supports, a series of holders are placed in the troughs and connected together by means of links 35 which pass through suitable eyes 36 formed on the sides of the holders. Then a quantity of electrolyte 37 is introduced to about the height indicated in Fig. 2 and thereafter the current will be turned on. The mechanical pulling device is then started and as one element is removed from the trough by this device another will be introduced and connected to the series by the workman. The various compartments of the troughs are connected by suitable circulating connections and there is provided a pump or air lift, not shown, by means of which the electrolyte is continuously circulated throughout the various compartments. As shown in Fig. 4 the elements in each compartment are connected in series by the connections illustrated. In Fig. 4 the current enters the bus-bar 37, passes through the conductor 27 to the anode 38 thence through the electrolyte to the element, thence ...rough the connectors and hinge members to the bus-bar 39, whence it will pass on by the connections illustrated to the next anode, and so on. It is obvious that the best deposition will occur when the elements are spaced opposite the anodes and accordingly the pulling device is so designed that it will move the chain of elements by the distance between a pair of anodes at each step.

Each holder is held in place by its contact member 31, which overlies the bus-bar on the edge of the partition 19 and the guide strip 28 serves to support the end of the element which projects from the holder. These holders may be given any desired outline along the lower edges and in this way they will determine the shape of the area on which the metal is to be deposited. The deposition will be carried on continuously while the elements are in the electrolytic troughs and the rate of movement of an element through the trough will be determined by the length of the trough and the thickness of the deposit and the rate at which it is to take place.

While the connections illustrated in Figs. 2 and 4 show all the anodes and elements of one trough in a series relation, it will be understood that this is not strictly such a connection, inasmuch as the electrolyte is conducting. In the arrangement shown in Fig. 3 the current enters the top bus-bar 40, passes down through the terminal 25 to the anode 41, thence through the electrolyte to the element, 42, thence over the edge of the trough and down to the anode 23 which is immediately below it. This provides a vertical series connection through the anodes and holders instead of a longitudinal one, as has previously been described in connection with Fig. 2. Of course the arrangements shown in Fig. 3 are not strictly series but are rather in a series parallel relation. However, it will be clear that various connections may be made and the anodes may be connected in various series and parallel groups so that the current density and the rate of deposition may be selected so as to provide a deposit of the desired characteristics, according to the source of current supply which is available.

I have also found that in order to secure a satisfactory uniform deposit it is necessary to change the inclination of the anodes at different stages in the deposition. For instance, with an anode and a holder in the relative positions indicated at 43 and 44 in Fig. 7, which are intended to indicate the positions at the start of the deposition, I have found that metal will be deposited more rapidly at the upper edge of the exposed surface of the element, indicated at 45 in Fig. 6. In order that the lower end of the element 46 may be properly coated and that the coating may be uniform, I change the inclination of the successive anodes, as shown at 47 and 48, Fig. 7, so that as the element passes along through the troughs the upper edge of each succeeding anode will be at a slightly greater distance from the surface of the element. I find that this accomplishes the desired result of causing the deposit to be uniform and it is very simply provided for by changing the angle of the stirrup formed on the anodes and changing the length of the terminals 25 in the later stages of deposition.

After a plating of suitable thickness has been made the elements are to be washed and, if desired, treated with some material which will modify the color of the deposit. Accordingly there is provided a series of tanks, indicated in general at 16 in Fig. 1, located beyond the end of the electrolytic troughs and arranged so that the elements are pulled through them after the troughs have been traversed. The troughs must of course be separate from these tanks and in order to permit the elements to pass from one to the other at the end of the troughs the partitions 19 are formed with a flattened slope as indicated at Figs. 8 and 9. This gradual flattening of the slope provides a cam surface 49 which permits the elements to ride up, pass over the end walls of the troughs and then drop into the first tank. This tank 50 is provided with fresh water so that any adhering electrolyte may be washed from the surface of the element. Succeeding this tank is a second 51, in which there is placed a weak alkaline solution to neutralize any remaining traces of the electrolyte. Beyond the tank 51 is a third tank 52 in which the color treatment may be carried on.

Each of these tanks is provided with suitable supporting means so that the elements connected together as indicated in Fig. 5 may be continuously pulled therethrough, and each tank will also be provided with cam surface so that the elements may pass over the end walls and from one tank to the next. In the coloring tank various solutions may be used to modify the color of the metal deposit and to produce various color effects. For instance, such substances as sal-ammoniac will be used and the effect produced will of course depend on the solution through which the element is drawn. From the coloring tanks the elements are withdrawn by the pulling mechanism 53 and the holders are removed to be returned by the conveyor 14. The finished elements are then placed on a conveyor 54 and transferred to storage or shipping rooms.

While I have described the deposition process with reference solely to one compartment of one tank of a battery, it will be understood that in the tank illustrated in Fig. 2 there are six compartments in which electro deposition may be carried on, the anodes and holders having been omitted in the upper two compartments for the sake of clearness. Each of these six compartments will have a series of elements passing continuously through them and as many of such tanks as may be desired will be arranged in a battery as illustrated in Fig. 1.

I have found that the deposition may be most satisfactorily carried on with these elements held in the inclined position in the electrolytic tanks, and the arrangements illustrated prevent the units from warping or buckling. Furthermore, such an arrangement permits of a series of troughs to be mounted in a single compact structure and by using the holders it is possible to hold the elements securely during the deposition step to limit the area on which the deposition is to occur and at the same time to provide a means by which the series of elements may be pulled through the tanks. Any suitable pulling device may be used, as for instance, an electric motor with a Geneva mechanism which gives the desired intermittent movement, and this will be so arranged that at each period of rest the holders are opposite the anodes, each forward step being sufficient to carry an element from one anode to the next.

After the deposition and washing, and in some cases coloring, have been carried on, the elements placed on the conveyor 54 will in some cases be taken to a drying station, and in others conveyed directly to the place at which they are to be packed together in bundles and then shipped or stored.

In practice I have found that a deposit of the desired thickness, uniformity, and density may be made in about one hour and accordingly an electrolytic tank which is long enough to hold about twenty units is of the most convenient size. A pulling apparatus will accordingly move the series of elements by the length of an element, one every three minutes, although of course the troughs will be somewhat longer than the exact length actually required so that there will be sufficient space at the ends for connecting elements to be coated. The layout illustrated in Fig. 1 is, however, compact, easily supervised, and the process may be carried on without interruption, thus securing a continuous production at as high a rate as may be conveniently taken care of.

The arrangement of the electrolytic tanks in the form of a series of superimposed compartments makes it possible to connect the anodes either in series or parallel relation in such combinations as will produce the best results. The selected connections will depend of course, on the character of the available supply of energy, the rate of deposition desired and on various other factors. The characteristics of the electrolyte will also be calculated in accordance with the conditions and the electrolyte will be periodically changed or renewed as the process continues.

The apparatus illustrated provides a convenient arrangement for carrying on the continuous process described, and while I have shown the parts designed and arranged to take care of roofing elements of the multiple unit type, it will be apparent that other forms of roofing may be as easily handled. For instance, if it is desired to treat elements in the form of a series of elements flexibly connected together, such as are shown in the co-pending application of Thomas Robinson, Ser. No. 622,514, filed March 3, 1923, it is only necessary to change the form of the anodes and holders. The roofing illustrated in that application, however, consists of a number of units which are spaced closely to one another, and there is a possibility that the current may short circuit through the electrolyte so that the proper deposition is interfered with. This difficulty is easily taken care of by providing screens in between the anodes, these screens being formed of some such material as sheet rubber. These screens will be attached to the lower surface of the inclined partitions and will extend nearly across the troughs. The flexibility of the material used will permit the elements to be moved past the screens without difficulty and when the elements are in a state of rest the screens will be so located as to extend between the ends of adjacent elements and thus prevent any short circuiting. The holders will of course be of a different form, depending on the form of the elements to be treated, and also on the areas which are to be exposed during the electrolytic treatment. Modifications in the apparatus necessary to meet these new conditions will of course be easily made by anyone familiar with the purpose and operation of the apparatus.

The metal which it is intended to employ for deposition purposes will preferably be copper, since it is easily deposited in a firm, uniform coating and since it gives an attractive surface and has a long life. Other metals, however, if desired, may be used for the purpose, such, for instance, as lead or zinc.

The process described makes it possible to carry on the several steps while the units are being continuously moved through the plant and the saving in time, and in the expense of handling large numbers of the units will be at once apparent. The coating is applied in a uniform manner over the entire weather surface of each element, by means of varied spacing between anode and element and the product obtained is durable, pleasing to the eye and in every way meets the requirements of a satisfactory roofing.

I claim:

1. A process for producing roofing elements consisting of a base and a metallic coating applied to the surface of the base, which comprises moving a series of bases through a cell containing a plurality of spaced anodes, with a step-by-step movement, and depositing a metallic coating on the bases by electrolysis during such movement.

2. A process for producing roofing elements consisting of a base and a metallic coating applied to the surface of the base, which comprises moving a series of bases with a step-by-step movement through a cell provided with a series of spaced anodes, bringing each base to rest in proximity to each anode in turn, and depositing a metallic coating on the bases by electrolysis during such movement.

3. A process for producing roofing elements consisting of a base and a metallic coating applied to the surface of the base, which comprises mounting a plurality of bases in individual holders connected together in series, moving the holders with the bases through a cell, and depositing a metallic coating on the bases by electrolysis during such movement.

4. A process for producing roofing elements consisting of a base and a metallic coating applied to the surface of the base, which comprises mounting a plurality of bases in individual holders with a portion thereof exposed, moving the holders and bases in a connected series through a cell containing a plurality of spaced anodes, and depositing a metallic coating on the exposed portions of the bases by electrolysis during such movement.

5. A process for producing roofing elements consisting of a base and a metallic coating applied to the surface of the base, which comprises moving a plurality of bases in a connected series through a cell containing a plurality of spaced anodes with a step-by-step movement such that each base comes successively to rest in proximity to each anode, the bases being supported during such movement in definite spaced relation to said anodes, and depositing a metallic coating on the moving bases by electrolysis.

6. A process for producing roofing elements consisting of a base and a metallic coating applied to the surface of the base, which comprises applying a conducting coating to the bases, mounting the bases in holders with the coated portion exposed, moving the holders with the bases through an electrolytic cell in a connected series and, during such movement, depositing a metallic coating on the conducting coating.

7. A process for producing roofing elements consisting of a base and a metallic coating applied to the surface of the base, which comprises moving a plurality of bases in a connected series through an electrolytic cell with a step-by-step movement, and, during such movement, electrolytically depositing a coating of metal over a surface thereon.

8. A process for producing roofing elements consisting of a base and a metallic coating applied to the surface of the base, which comprises applying a conducting coating to the bases, mounting each base in an individual holder to expose a coated area thereof, connecting the holders to form a series, moving the series of connected holders with the bases through an electrolytic cell, and, during such movement, depositing a metallic layer on the exposed areas of the bases.

9. Apparatus for producing roofing elements of the type described, comprising an electrolytic trough having an inclined side wall, means movable through the trough for supporting individual elements in an inclined position, and means to move said supporting means through the trough with a step-by-step movement.

10. Apparatus for producing roofing elements of the type described, comprising an electrolytic trough having an inclined side wall, holders for individual elements, having means co-operating with said side wall to support said holders in said trough, and means to move a plurality of said holders through said trough.

11. Apparatus for producing roofing elements of the type described, comprising an electrolytic trough having an inclined side wall, holders for individual elements having means overhanging said side wall to support said holders in said trough in an inclined position, a plurality of wash tanks and means to move a plurality of said holders and elements through said cell and said tanks.

12. Apparatus for producing roofing elements of the type described, comprising a plurality of long, narrow electrolytic troughs disposed with their longitudinal axes parallel, spaced anodes mounted in each trough and means associated with the troughs for moving a series of cathode members therethrough.

13. Apparatus for producing roofing elements of the type described, comprising a plurality of electrolytic troughs of greater length than width lying parallel, spaced anodes mounted along each trough and means associated with the troughs for simultaneously moving a series of cathode members through each of the troughs.

14. Apparatus for producing roofing elements of the type described, comprising a plurality of electrolytic troughs of greater length than width lying parallel, spaced anodes mounted along each trough, and means for moving a series of cathode members through the troughs in definite spaced relation to said anodes.

15. Apparatus for producing roofing elements of the type described comprising a plurality of superposed electrolytic troughs, a series of anodes in said troughs in spaced relation, a plurality of cathode members in each trough and means for moving the cathode members through the troughs.

16. Apparatus for producing roofing elements of the type described, comprising a plurality of electrolytic troughs, a series of anodes mounted in each trough in spaced relation to the walls thereof, a plurality of cathode members in each trough, a guide member for guiding the cathode members in spaced relation to said anodes, and means for moving the cathode members through the troughs.

17. Apparatus for producing roofing elements of the type described, comprising a plurality of electrolytic troughs, a series of anodes mounted in each trough in spaced relation to the walls thereof, a plurality of cathode members in each trough, a guide member on the side wall of each trough for guiding the cathode members in spaced relation to said anodes, and means for moving the cathode members through the troughs.

18. An electrolytic cell comprising a plurality of long narrow troughs mounted in superposed relation on a base with their longitudinal axis parallel.

19. An electrolytic cell comprising a plurality of long, narrow troughs mounted on a base in superposed relation with their longitudinal axes parallel, each trough containing a series of spaced anodes.

20. An electrolytic cell comprising a plurality of long, narrow troughs mounted on a base in superposed relation with their longitudinal axes parallel, each trough containing a row of platelike anodes lying along the trough in spaced relation, with their greatest dimension parallel to the longitudinal axis of the trough.

21. An electrolytic cell comprising a plurality of troughs of greater length than width lying in superposed relation with their longitudinal axes parallel, adjacent troughs having one wall in common.

22. An electrolytic cell comprising a plurality of troughs lying in superposed relation and a row of anodes suspended along each trough in definite spaced relation to the walls thereof.

23. An electrolytic cell comprising a plurality of troughs lying in superposed relation, a series of anodes in each trough, a contact connected with each anode, a series of holders for carrying roofing elements, and a conductor in each holder for connecting the element with one of the contacts.

24. An electrolytic cell comprising a plurality of troughs lying side by side, a series of anodes in each trough, a contact connected with each anode, a series of nonconducting holders for carrying roofing elements, and a conductor in each holder for connecting the element with the contacts, means for connecting the holders together and means for moving the series of connected holders through the cell.

25. An electrolytic cell, comprising a trough having an inclined side wall, a plurality of spaced anodes suspended in said trough and a plurality of cathode members lying parallel to said inclined wall and movable past said anodes.

26. An electrolytic cell, comprising a trough having an inclined side wall and containing an electrolyte, a plurality of spaced anodes in said trough, a plurality of cathode members movable along said wall in an inclined position and means on the wall to raise said cathode members out of said electrolyte as said members approach one end of the trough.

27. An electrolytic cell, comprising a trough having an inclined side wall and containing an electrolyte, a plurality of cathode members movable along said wall, and a plurality of anodes suspended in said trough, one end of said anodes being spaced from the path of said cathode members by progressively increasing distances.

28. An electrolytic cell comprising a central partition and a plurality of inclined side walls mounted in said partition above one another in spaced relation.

29. An electrolytic cell comprising a trough having an inclined side wall, a plurality of spaced anodes in said trough, a plurality of cathode members in said trough and means to connect each cathode with the anode next beyond it along the trough.

30. An electrolytic cell comprising a trough having an inclined side wall, a plurality of spaced anodes in said trough, a plurality of spaced bus-bars on the outer edge of said side wall, and means to support a plurality of elements having conducting areas thereon as cathodes in said trough and to connect said areas electrically to said bus-bars.

31. An electrolytic cell, comprising a trough having an inclined side wall, a plurality of anodes in said trough, a plurality of spaced bus-bars on the outer edge of said side wall, means to support a plurality of elements having conducting areas thereon as cathodes in said trough, means to connect said areas electrically to said bus-bars and means to connect each bus-bar to the anode next beyond it along the trough.

32. A holder for the cathode elements of an electrolytic cell, comprising a pair of plates of non-conducting material hinged together along one edge, a latch to hold the plates in closed relation, and a contact in one plate disposed so as to lie against the element in the holder.

33. A holder for the cathode elements of an electrolytic cell, comprising a pair of plates of non-conducting material hinged together along one edge, a latch to hold the plates in closed relation, a contact in the face of one plate, a contact projecting beyond the ends of the plates and an electrical connection between the contacts.

34. A holder for the cathode elements of an electrolytic cell, comprising a pair of plates of non-conducting material hinged together along one edge, a contact member extending beyond the ends of the plates and engaging the wall of the electrolytic cell, a contact in one plate disposed so as to lie against the element in the holder, and a conductor embedded in the said plate and connected to the contact members.

In testimony whereof I affix my signature.

JULIUS H. GILLIS.